United States Patent
Hendzel et al.

(10) Patent No.: US 6,719,119 B1
(45) Date of Patent: Apr. 13, 2004

(54) SELF-STORING ROLLER CONVEYOR EXTENSION

(75) Inventors: Louis J. Hendzel, Owego, NY (US); Robert R. Ricci, Downington, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/400,335

(22) Filed: Mar. 27, 2003

(51) Int. Cl.[7] ............................................. B65G 13/00
(52) U.S. Cl. ..................... 193/35 TE; 193/35 TE; 198/861.3; 198/861.5; 198/592
(58) Field of Search .................. 193/35 TE; 198/861.1, 198/861.3, 861.5, 588, 592, 593, 594, 812

(56) References Cited

U.S. PATENT DOCUMENTS

| | | |
|---|---|---|
| 4,640,404 A | 2/1987 | Bigott |
| 4,753,337 A | 6/1988 | Grosjean |
| 4,754,867 A * | 7/1988 | De Anda ................. 198/861.5 |
| 4,852,712 A * | 8/1989 | Best ....................... 193/35 TE |
| 5,172,804 A * | 12/1992 | Chersin ................... 198/861.5 |
| 6,068,111 A | 5/2000 | Smith et al. |
| 6,409,011 B1 * | 6/2002 | Ferguson ............... 198/861.13 |
| 6,484,869 B1 * | 11/2002 | Brouwer et al. ............ 198/592 |

* cited by examiner

*Primary Examiner*—James R. Bidwell
(74) *Attorney, Agent, or Firm*—Louis J. Franco; Leland D. Schultz; Patrick M. Hogan

(57) ABSTRACT

A roller conveyor extension includes a base frame having elongated parallel first and second tracks, each of the tracks having rearward and forward ends. First and second carriages reciprocate rearwardly and forwardly between the rearward and forward ends of, respectively, the first and second tracks. A roller support structure having back and front ends, and extending along an axis, supports a plurality of rollers, each of which rollers is adapted for rotational motion about a roller axis extending along an axis perpendicular to the roller support structure axis. The roller support structure is pivotably attached to each of the first and second carriages such that the roller support structure is capable of both rotational motion about a pivot axis and rearward and forward reciprocating motion with respect to the base frame.

14 Claims, 3 Drawing Sheets

SELF-STORING ROLLER CONVEYOR EXTENSION

BACKGROUND

1. Field

Although not so limited in its utility or scope, implementations of the present invention are particularly well suited for incorporation in material sortation systems such as those used in moving mail pieces through various stages of processing in a mail processing facility, for example.

2. Brief Description of an Illustrative Environment and Related Art

Material handling operations frequently involve the use of transport systems including networks of conveyor belts and roller conveyors. In a typical material sorting environment, a material receptacle is located at each terminus of a selected plurality of termini for the collection of material exiting the sortation system. Commonly, an output chute corresponds to a terminus and includes a surface sloped downwardly toward the receptacle for guiding material exiting the sortation system into the receptacle situated below the chute. Illustrative, commonly used, material receptacles include flexible receptacles such as sacks and bags, for example, and rigid receptacles such as boxes, crates, cartons, and carts, for instance.

In a typical package or mail sortation system, multiple, adjacent output chutes are arranged along a base structure such as a longitudinally extending main framework adapted for supporting plural chutes. Moreover, the exit (or drop-off) ends of adjacent chutes, each of which chutes typically extends along an axis orthogonal to the longitudinal axis of the main framework, are generally coextensive with respect to the main framework from which they depend. There are occasions on which it is desirable to transport material exiting a chute to a location farther away from the main framework than that material would be transported if it were simply allowed to fall off the drop-off end of the chute. That is, it is sometimes desirable to effectively extend the discharge point of an output chute. The desirability of such circumstances may depend, for instance, on the type of material receptacle being used to contain packages exiting the chute in question and the types of receptacles being used to contain packages exiting neighboring chutes. Various types of extensions are used for such purposes including, for example, slide extensions, roller extensions, and conveyor-belt extensions.

Presently, the roller conveyor extensions in wide use are modules which, when not in use, are detached from the main framework from which they depend when in use. Typically, these roller conveyor extension modules are heavy and cumbersome apparatus frequently requiring more than one person to detach and relocate them for storage. In addition to the demand in time and worker effort to detach and attach roller conveyor extension modules, roller extension modules must be stored in a safe place, out of the way of material-handling operations and walkways, for example, which consumes often limited working space.

Accordingly, there is a need for a roller extension that need not be removed for storage and which, in a typical embodiment, is conveniently movable between storage and operative positions by a single person.

SUMMARY

In various embodiments, a self-storing roller conveyor extension includes a base frame adapted for one of permanent and removable dependence from the main framework supporting a material-guiding output chute. The base frame of a typical embodiment includes first and second laterally spaced, parallel elongated tracks extending along a first axis, each track having a rearward end and forward end. Adapted for translational reciprocation along and between the rearward and forward ends of the first and second tracks, respectively, are a first carriage and a second carriage. The carriages are pivotably attached to a roller support structure as described in further detail below.

A roller support structure includes first and second laterally spaced, elongated frame members arranged in parallel and extending along a second axis. Each of the first and second frame members has a first end and a second end coinciding with, respectively, back and front ends of the roller support structure. A plurality of rollers is supported by, and extends between, the parallel frame members of the support structure. Each of the rollers rotates about an axis perpendicular to the second axis and parallel to the axes about which other rollers among the plurality of rollers rotates. The first and second elongated frame members of the roller support structure are pivotably attached to, respectively, the first and second carriages in a location less distant from the back end of the roller support structure than the front end of the roller support structure. The pivotable attachment of the roller support structure to the carriages renders the roller support structure capable of both rotational motion about a pivot axis and rearward and forward reciprocal motion with respect to the base frame.

In a typical implementation, when the base frame is oriented such that the tracks extend parallel to a first plane that is disposed one of (i) parallel to and (ii) at an angle of less than 45° with respect to a horizontal plane, the roller support structure is pivotable about a pivot axis perpendicular to the first axis between a first, storage position and a second, operative position as follows. The storage position is such that the first and second elongated frame members of the roller support structure extend downwardly below the base frame along a second plane that is disposed one of (i) parallel to and (ii) at an angle greater than 0°, but less than 45° with respect to a vertical plane. The operative position is typically such that the first and second elongated frame members one of (i) extend horizontally and (ii) decline away from the pivot axis at an angle greater than 0°, but less than 45° with respect to a horizontal plane that includes the pivot axis.

In various embodiments, at least one of (i) the base frame and (ii) the roller support structure includes at least one horizontally extending protrusion and the other of the base frame and the roller support structure includes a protrusion-engaging surface with which the horizontally extending protrusion can be selectively placed in supporting engagement to retain the roller support structure in an operative position. In one illustrative version, the first and second elongated frame members of the roller support structure are pivotably mounted to respective carriages such that the elongated frame members are to the exterior of the tracks. In one such version, a horizontally extending protrusion depending from the roller support structure extends inwardly for selective supporting engagement with a protrusion-engaging surface depending from the base frame, while, in another such version, a horizontally extending protrusion depending from the base frame extends outwardly for selective supporting engagement with a protrusion-engaging surface depending from the roller support structure. In various versions including a horizontally extending protrusion, the applicable one of the base frame and the roller support structure includes at least two protrusion-engaging surfaces disposed at different heights with respect to a horizontal plane such that the roller support structure can be alternatively supported at different angles with respect to a horizontal plane by the alternate supporting engagement of the horizontally extending protrusion with each of the at least two protrusion-engaging surfaces.

In a typical illustrative setting, a roller conveyor extension is mounted for dependence from a framework such that the base frame of the conveyor extension is underneath the downwardly sloped surface of a material guiding chute. When the roller support structure is in a storage position, it extends downwardly below the material guiding chute in location rearward of the drop-off end of the chute. In order to deploy the roller support structure of the roller conveyor extension, a user reaches below the chute, draws the roller support structure linearly toward him/herself such that the carriages move toward their forwardmost positions, pivots the roller support structure to raise the extension drop off end (i.e., front end) of the roller support structure, and places at least one horizontally extending protrusion in supporting engagement with a protrusion-engaging surface to maintain the roller extension in a deployed position in which the extension drop off end is more forward than (i.e., extends beyond) the drop off end of the chute to which the roller conveyor extension corresponds.

In additional embodiments, a carriage pull depends from, and extends forwardly of, at least one of the carriages. Each carriage pull is adapted for grasping by a user for movement of the roller support structure forward and backward on the tracks. The carriage pull is particularly useful for accessing a stored roller support structure when the carriages are near their rearwardmost positions on the tracks.

In further alternative embodiments, a base frame includes an elongated track extending parallel to a first axis and having a rearward end and a forward end. A roller support structure having back and front ends includes an elongated frame member extending along a second axis and having first and second ends coinciding with back and front ends of the roller support structure. A plurality of rollers is supported by and along the length of the frame member. Each roller is supported for rotation about an axis extending along an axis perpendicular to the second axis. A carriage adapted for translating reciprocation between the rearward and forward ends of the track is pivotably attached to the roller support structure in a location less distant from the back end of the roller support structure than the front end of the roller support structure such that the support structure is capable of both rotational motion about a pivot axis and rearward and forward reciprocating motion with respect to the base frame.

Representative embodiments of the invention are more completely described and depicted in the following detailed description and the accompanying drawings.

DETAILED DESCRIPTION

The following description of various embodiments of a self-storing roller conveyor extension is illustrative in nature and is therefore not intended to limit the scope of the invention or its application of uses.

Figure 1:
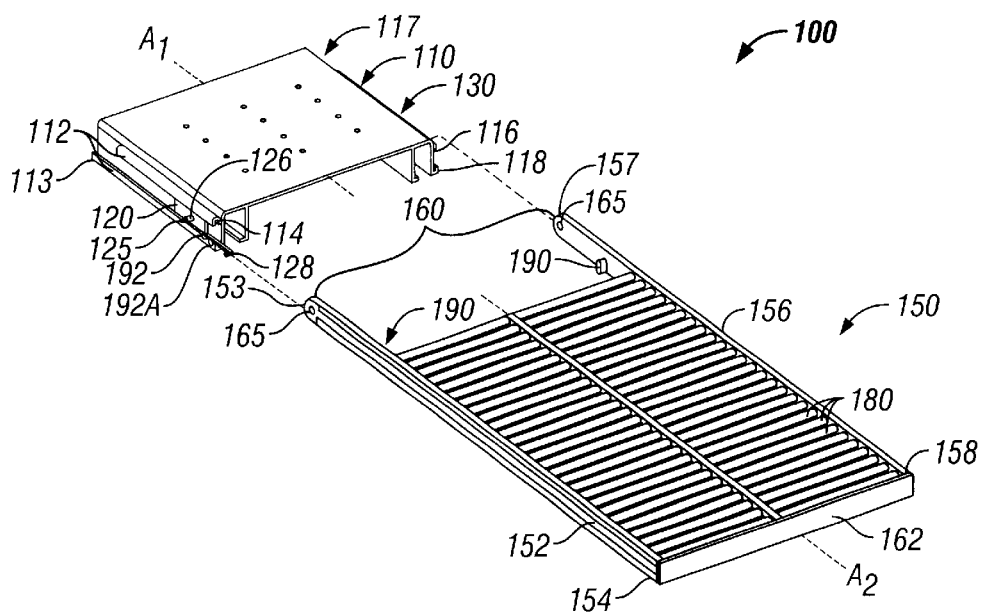
FIG. 1 depicts a partially unassembled self-storing roller conveyor extension.

Referring to FIG. 1, an illustrative self-storing roller conveyor extension 100 includes a base frame 110 adapted for one of permanent and removable dependence from the main framework supporting a material-guiding output chute, for example, as shown in subsequent drawings. The base frame 110 includes spaced apart, parallel first and second tracks 112 and 116 extending parallel to a first axis $A_1$. The first track 112 includes a rearward end 113 and a forward end 114 and the second track 116 includes a rearward end 117 and a forward end 118. A first carriage 120 is adapted for reciprocating translation between the rearward and forward ends 113 and 114 of the first track 112. Similarly, although only the corresponding location of the same is indicated in FIG. 1, a second carriage 130 adapted for reciprocating translation between the rearward and forward ends 117 and 118 of the second track 116 is included.

Referring still to FIG. 1, the roller conveyor extension 100 further includes a roller support structure 150. The roller support structure 150 includes first and second laterally spaced, elongated frame members 152 and 156 arranged in parallel and extending parallel to a second axis $A_2$. The first frame member 152 has first and second ends 153 and 154 and the second frame member 156 has first and second ends 157 and 158. The first ends 153 and 157 of the first and second frame members 152 and 156 coincide with a back end 160 of the roller support structure 150, while the second ends 154 and 158 of the frame members 152 and 156 coincide with a front end 162 of the roller support structure 150.

A plurality of rollers 180 is supported by, and extends between, the parallel frame members 152 and 156 of the roller support structure 150. Each of the rollers 180 rotates about an axis perpendicular to the second axis $A_2$ and parallel to the axes about which other rollers 180 among the plurality of rollers rotate 180.

In the illustrative version of FIG. 1, the roller support structure 150 is pivotally and linearly movable with respect to the base frame 110 as follows. The first and second elongated frame members 152 and 156 of the roller support structure 150 are pivotably attached to, respectively, first and second carriages 120 and 130 in a location less distant from the back end 160 of the roller support structure 150 than the front end 162 of the roller support structure 150. The pivotable attachment of the roller support structure 150 to the carriages 120 and 130 renders the roller support structure 150 capable of both rotational motion about a pivot axis (axis implicit, not shown) and reciprocation rearward and forward with respect to the base frame 110.

Figure 1A:
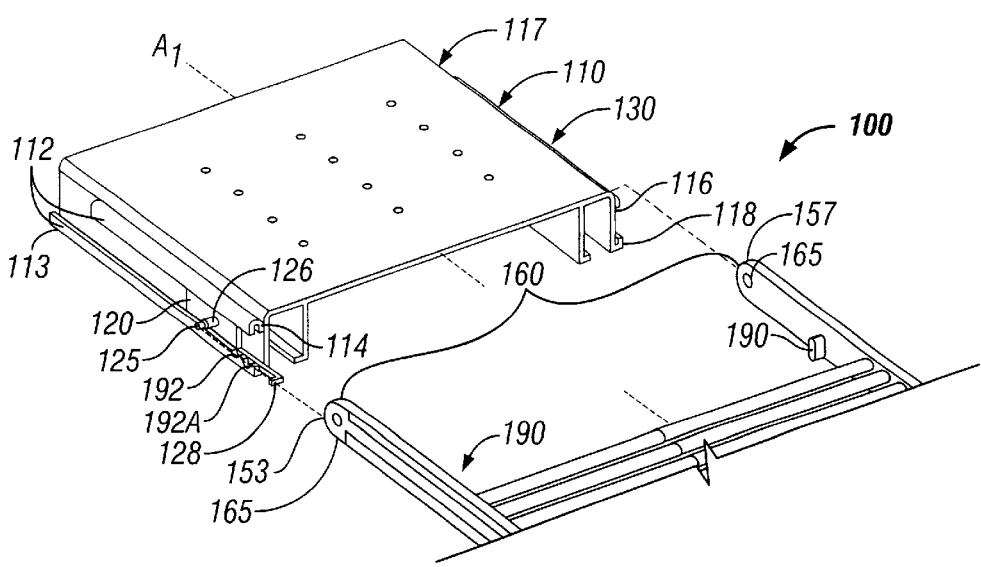
FIG. 1A is an enlarged view of portions of the base frame and roller support structure shown in FIG. 1.

The specific manner of pivotal connection between the roller support structure 150 and the carriages 120 and 130 is of no particular relevance. In the illustrative versions of the drawings, each of the first and second carriages 120 and 130 includes a horizontally extending pivot member 125 having a cylindrical surface 126 that is adapted for at least partial insertion into a pivot aperture 165 defined in the respective one of the first and second frame members 152 and 156 with which that carriage 120 or 130 is pivotably engaged. Details of the illustrative carriage 120 and pivot aperture 165 in FIG. 1 are shown in the enlargement of FIG. 1A. It will be readily appreciated that numerous configurations within the scope and contemplation of the invention, but not illustrated, are possible. For instance, a horizontally extending pivot member 125 may depend from one or both of the first and second frame members 152 and 156 to pivotably engage a pivot aperture in a respective carriage 120 or 130 or a pin may extend into an aperture in each of a carriage and frame member, by way of non-limiting example.

As with the pivotal connection between the carriages 120 and 130 and the roller support structure 150, the manner in which reciprocable motion between the carriages 120 and 130 and their respective tracks 112 and 116 is facilitated is of no particular relevance. In one illustrative version, a carriage 120 is in sliding engagement with its track 112 and friction is reduced by the application of a lubricant such as grease. In an alternative version, the carriage 120 is provided with roller members (not shown) so that the carriage 120 is rollable along the track 112. In still another illustrative, non-limiting example, the track 112 is provided with a series of roller members (e.g., bearings and or wheels, not shown) to facilitate rolling of the carriage 120 along the track 112. The fabricator of an embodiment may make reference to any number of extant, analogously functioning apparatus (e.g., drawer slides) for guidance in designing and assembling alternative versions.

Figure 2:
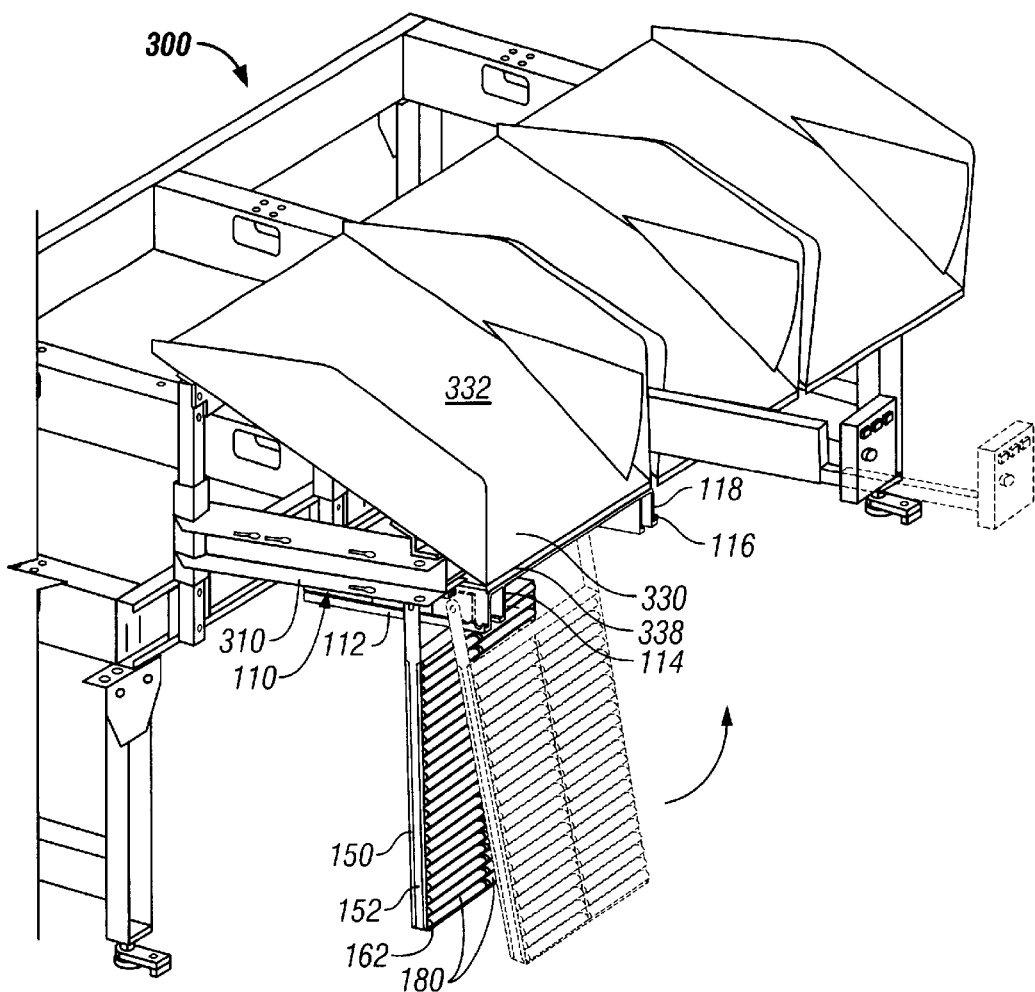
FIG. 2 shows a self-storing roller conveyor extension mounted to the main framework of a material sorting apparatus and, in phantom lines, the roller support structure being pivoted toward an operative position.
Figure 3:
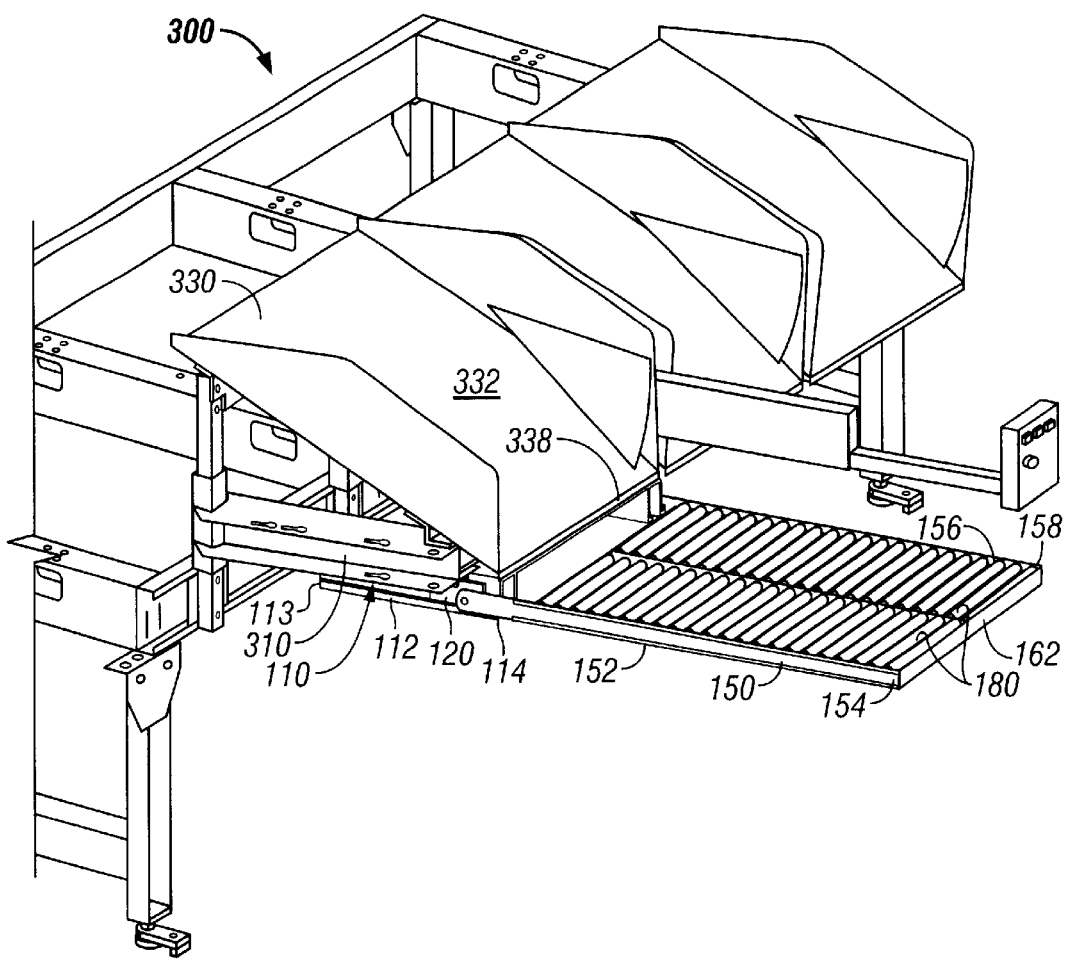
FIG. 3 depicts the illustrative self-storing roller conveyor extension of FIG. 2 with the roller support structure in an operative position.

FIGS. 2 and 3 depict a typical implementation of a roller conveyor extension 100 in a representative material sorting environment. Referring to FIG. 2, the base frame 110 of the roller conveyor extension 100 is mounted to beams 310 cantileveredly depending from a base structure 300. Moreover, the base frame 110 of the illustrative roller conveyor extension 100 is situated below the downwardly sloped slide surface 332 or a material guiding chute 330 with its tracks 112 and 116 extending along, but not necessarily parallel to, a horizontal plane (not shown). For instance, the base frame 110, in various implementations, may be mounted such that the tracks 112 and 116 extend parallel to a first plane (not shown) that is disposed at least one of (i) parallel to and (ii) at an angle of less than 45° with respect to a horizontal plane and the tracks 112 and 116 could still be said to "extend along" that horizontal plane since their horizontal component of extension would still be greater than their vertical component of extension. For purposes of this specification and the appended claims, it is to be understood that an interpretation analogous to the interpretation explained above in connection with "extending along," or any syntactical variation thereof, applies whenever one element, line or plane is described as "extending along" another plane or line, for example. Thus, for instance, a plane A that is disposed one of (i) parallel to and (ii) at an angle of less than 45° with respect to a plane B "extends along" plane B.

When the roller support structure 150 is in a storage position, such as the position of the roller support structure 150 depicted in solid lines in FIG. 2, it extends downwardly below the material guiding chute 330 in a location rearward of the drop-off end 338 of the chute 330. Typically, the storage position is such that the first and second elongated frame members 152 and 156 of the roller support structure 150 extend downwardly below the base frame 110 along a vertical plane.

In order to bring the roller support structure 150 from a storage position to an operative position, a user (i) draws the roller support structure 150 linearly toward him/herself such that the carriages 120 and 130 move along the tracks 112 and 116 toward their forwardmost positions, (ii) pivots the roller support structure 150 to raise the extension drop off end (e.g., the second end 162 of the roller support structure 150), and (iii) sets the roller support structure 150 in an operative position, such as the position shown in FIG. 3. An operative position is typically one is in which the first and second elongated frame members 152 and 156 of the roller support structure 150 one of (i) extend horizontally and (ii) decline away from the pivot axis at an angle of less than 45° with respect to a horizontal plane (not shown) that includes the pivot axis. Shown in phantom lines in FIG. 2 is the roller support structure 150 being pivoted toward an operative position.

Referring to the enlarged detail view of FIG. 1A, the illustrative embodiment includes apparatus to assist a user in drawing a stored roller support structure 150 toward himself and for setting the roller support structure 150 in an operative position. Depending from, and extending forwardly of, the carriage 120 is a carriage pull 128. The carriage pull 128 facilitates convenient access to a stored roller support structure 150 and is particularly useful when the carriages 120 and 130 are closer to their rearwardmost positions than to their forwardmost positions on their respective tracks 112 and 116. Although not shown, in various embodiments, a second carriage pull 128 depends from the second carriage 130.

Also shown in FIG. 1A are apparatus for setting the roller support structure 150 in an operative position. In various embodiments, a user pivots the roller support structure 150 toward an operative position and linearly aligns, and places in supporting engagement with one another, at least one horizontally extending protrusion 190 depending from one of the roller support structure 150 and the base frame 110 and a protrusion-engaging surface 192 on the other of the base frame 110 and the roller support structure 150 to maintain the roller support structure 150 in an operative position. In the particular example of FIGS. 1 and 1A, the first track 120 includes two protrusion-engaging surfaces 192 and 192A adapted for alternate engagement with a protrusion 190 extending inwardly from the first frame member 152 of the roller support structure 150. The protrusion-engaging surfaces 192 and 192A are at different heights such that the roller support structure 150 can be selectively disposed at different angles with respect to the base frame 110. An examination of FIGS. 1 and 1A will also clarify that, in order to bring the depicted roller support structure 150 from a storage position to an operative position, a user must ensure that the carriages 120 and 130 are drawn sufficiently far forward for the rearwardmost rollers 180 to clear the forward ends 114 and 118 of the tracks 112 and 116 as the roller support structure 150 is pivoted upwardly to bring the protrusions 190 to a level higher than the protrusion-engaging surface 192. Once the rearwardmost rollers 180 have cleared the tracks 112 and 116, the roller support structure 150 is urged rearwardly along the tracks 112 and 116 until at least one protrusion 190 is aligned with a desired one of the at least one protrusion-engaging surfaces 192. A person of ordinary skill in the relevant art will readily appreciate that various embodiments may include plural (two or more) protrusions 190 and plural protrusion-engaging surfaces 192 adapted for alternate, selective engagement with one or more protrusions 190 and that these protrusion-engaging surfaces 192 and protrusions 190 may be variously configured and located resulting in deployment procedures different from the procedure described above.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A roller conveyor extension comprising:
   a base frame including an elongated track extending parallel to a first axis, the track having a rearward end and a forward end;
   a roller support structure including an elongated frame member extending parallel to a second axis, the frame member having a first end and a second end coinciding with, respectively, back and front ends of the roller support structure;
   a plurality of rollers supported by the frame member of the roller support structure, each roller being supported for rotation about an axis extending along an axis perpendicular to the second axis; and
   a carriage adapted for translating reciprocation between the reward and forward ends of the track, the carriage being pivotably attached to the roller support structure in a location less distant from the back end of the roller support structure than the front end of the roller support structure such that the roller support structure is capable of both rotational motion about a pivot axis and rearward and forward reciprocating motion with respect to the base frame.

2. The roller conveyor extension of claim 1 wherein, when the base frame is oriented such that the track extends along a horizontal plane, the roller support structure is pivotable between a first, storage position in which the elongated frame member extends downwardly below the base frame along a vertical plane and a second, operative position in which the elongated frame member one of (i) extends horizontally and (ii) declines away from the pivot axis at an angle greater than 0 degrees, but less than 45 degrees with respect to a horizontal plane that includes the pivot axis.

3. The roller conveyor extension of claim 2 wherein at least one of (i) the base frame and (ii) the roller support structure includes at least one horizontally extending protrusion and the other of the base frame and the roller support structure includes at least one protrusion-engaging surface with which the horizontally extending protrusion can be selectively placed in supporting engagement to selectively retain the roller support structure in an operative position.

4. The roller conveyor extension of claim 3 wherein one of the roller support structure and the base frame includes at least two protrusion-engaging surfaces disposed at different heights such that the roller support structure can be alternatively supported at different angles with respect to a horizontal plane by the alternative supporting engagement of at least one of the at least one protrusions with each of the at least two protrusion-engaging surfaces.

5. The roller conveyor extension of claim 2 further comprising a carriage pull extending forwardly of and depending from the carriage, the carriage pull being adapted for grasping by a user to move the roller support structure forward and backward on the track.

6. The roller conveyor extension of claim 5 wherein at least one of (i) the base frame and (ii) the roller support structure includes at least one horizontally extending protrusion and the other of the base frame and the roller support structure includes at least one protrusion-engaging surface with which the horizontally extending protrusion can be selectively placed in supporting engagement to selectively retain the roller support structure in an operative position.

7. The roller conveyor extension of claim 6 wherein one of the roller support structure and the base frame includes at least two protrusion-engaging surfaces disposed at different heights such that the roller support structure can be alternatively supported at different angles with respect to a horizontal plane by the alternative supporting engagement of at least one of the at least one protrusions with each of the at least two protrusion-engaging surfaces.

8. A roller conveyor extension comprising:
   a base frame including first and second laterally spaced, elongated tracks arranged in parallel, each of the first and second tracks having a rearward end and a forward end;
   a roller support structure including first and second laterally spaced, elongated frame members arranged in parallel, each of the first and second frame members having a first end and a second end coinciding with, respectively, back and front ends of the roller support structure;
   a plurality of rollers supported by, and extending between, the parallel frame members of the roller support structure; and
   a first carriage adapted for translating reciprocation between the reward and forward ends of the first track and a second carriage adapted for translating reciprocation between the rearward and forward ends of the second track, the first and second carriages being pivotably attached to, respectively, the first and second elongated frame members of the roller support structure in a location less distant from the back end of the roller support structure than the front end of the roller support structure such that the roller support structure is capable of both rotational motion about a pivot axis and rearward and forward reciprocating motion with respect to the base frame.

9. The roller conveyor extension of claim 8 wherein, when the base frame is oriented such that the tracks extend parallel to a first plane that is disposed at least one of (i) parallel to and (ii) at an angle of less than 45 degrees with respect to a horizontal plane, the roller support structure is pivotable between a first, storage position in which the first and second elongated frame members extend downwardly below the base frame along a vertical plane and a second, operative position in which the first and second elongated frame members one of (i) extend horizontally and (ii) decline away from the pivot axis at an angle greater than 0 degrees, but less than 45 degrees with respect to a horizontal plane that includes the pivot axis.

10. The roller conveyor extension of claim 9 wherein at least one of (i) the base frame and (ii) the roller support structure includes at least one horizontally extending protrusion and the other of the base frame and the roller support structure includes at least one protrusion-engaging surface with which the horizontally extending protrusion can be selectively placed in supporting engagement to selectively retain the roller support structure in an operative position.

11. The roller conveyor extension of claim 10 wherein one of the roller support structure and the base frame includes at least two protrusion-engaging surfaces disposed at different heights such that the roller support structure can be alternatively supported at different angles with respect to a horizontal plane by the alternative supporting engagement of at least one of the at least one protrusions with each of the at least two protrusion-engaging surfaces.

12. The roller conveyor extension of claim 9 further comprising a carriage pull extending forwardly of and depending from at least one of the first and second carriages, each carriage pull being adapted for grasping by a user to move the roller support structure forward and backward on the tracks.

13. The roller conveyor extension of claim 12 wherein at least one of (i) the base frame and (ii) the roller support structure includes at least one horizontally extending protrusion and the other of the base frame and the roller support structure includes at least one protrusion-engaging surface with which the horizontally extending protrusion can be selectively placed in supporting engagement to selectively retain the roller support structure in an operative position.

14. The roller conveyor extension of claim 13 wherein one of the roller support structure and the base frame includes at least two protrusion-engaging surfaces disposed at different heights such that the roller support structure can be alternatively supported at different angles with respect to a horizontal plane by the alternative supporting engagement of at least one of the at least one protrusions with each of the at least two protrusion-engaging surfaces.

* * * * *